(12) United States Patent
Reiling

(10) Patent No.: US 7,323,038 B2
(45) Date of Patent: Jan. 29, 2008

(54) SEPARATION OF GASES AND SOLIDS USING A CYCLONE

(75) Inventor: Vince Reiling, Vauvenargues (FR)

(73) Assignee: Ineos Europe Limited, Hampshire (GB)

( * ) Notice: Subject to any disclaimer, the term of this patent is extended or adjusted under 35 U.S.C. 154(b) by 353 days.

(21) Appl. No.: 10/508,163

(22) PCT Filed: Mar. 13, 2003

(86) PCT No.: PCT/GB03/01072

§ 371 (c)(1),
(2), (4) Date: Sep. 17, 2004

(87) PCT Pub. No.: WO03/080253

PCT Pub. Date: Oct. 2, 2003

(65) Prior Publication Data

US 2005/0126394 A1    Jun. 16, 2005

(30) Foreign Application Priority Data

Mar. 19, 2002  (EP)  ................................. 02358004

(51) Int. Cl.
*B01D 45/12*    (2006.01)
(52) U.S. Cl. ........................................ 95/271; 55/459.1
(58) Field of Classification Search ............... 55/459.1; 95/271
See application file for complete search history.

(56) References Cited

U.S. PATENT DOCUMENTS

| | | |
|---|---|---|
| 4,486,207 A | 12/1984 | Baillie |
| 4,530,914 A | 7/1985 | Ewen et al. |
| 4,808,561 A | 2/1989 | Welborn, Jr. |
| 4,897,455 A | 1/1990 | Welborn, Jr. |
| 5,075,270 A | 12/1991 | Brun et al. |
| 5,124,418 A | 6/1992 | Welborn, Jr. |
| 5,278,119 A | 1/1994 | Turner et al. |
| 5,278,264 A | 1/1994 | Spaleck et al. |
| 5,283,278 A | 2/1994 | Daire et al. |
| 5,304,614 A | 4/1994 | Winter et al. |
| 5,771,844 A | 6/1998 | Dietz |
| 6,391,153 B1 * | 5/2002 | Wikdahl ...................... 162/55 |

FOREIGN PATENT DOCUMENTS

| | | |
|---|---|---|
| EP | 0 564 992 A2 | 10/1993 |
| EP | 0 972 572 A2 | 1/2000 |

* cited by examiner

*Primary Examiner*—Robert A. Hopkins
(74) *Attorney, Agent, or Firm*—Finnegan, Henderson, Farabow, Garrett and Dunner, L.L.P.

(57) ABSTRACT

Cyclone design comprising an inlet device having an inlet height (Hi) and an inlet width (Wi), a gas outlet pipe having a pipe diameter (Di) and a pipe penetration (P), a barrel having an upper barrel diameter (Db) and a barrel length (Lb), said barrel comprising a cylindrical volume on top of a conical volume, a solids outlet pipe (O), an inlet gas velocity (Ug, i) and an inlet gas flow (Q), characterised in that the ratio of the inlet gas flow to the square of the upper barrel diameter $(Q/Db^2)$ is higher than 0.5, preferably higher than 0.7, and lower than 1.5, preferably lower than 1.2 (m/s) and in that the barrel length to diameter ratio (Lb/Db) is higher than 3, preferably higher than 3.5, and lower than 6, preferably lower than 4.5.

15 Claims, 8 Drawing Sheets

SEPARATION OF GASES AND SOLIDS USING A CYCLONE

This invention relates to a novel design for a cyclone.

This invention also relates to a process for the separation of a mixture of gas and solids using a cyclone.

This invention also relates to a process for gas phase polymerisation of olefins by means of a fluidised bed reactor, in which olefins are directly converted into polymers or copolymers.

It is known to polymerise one or more olefins from a gaseous reaction mixture containing the olefin(s) to be polymerised, in a fluidised bed reactor where polymer particles that are being formed are kept in the fluidised state by means of the gaseous reaction mixture travelling as an ascending stream. The gas mixture leaving via the top of the fluidised bed reactor is recycled to the base of the latter by means of a recycle line and a compressor. While being thus recycled, the gas mixture is in most cases cooled with the aid of a heat exchanger so as to remove the heat produced during the polymerisation reaction. The polymerisation reaction may be carried out in the presence of a catalyst system comprising a solid catalyst. High activity catalyst systems capable of producing large quantities of polymer in a relatively short time and thus making it possible to avoid a step of removing catalyst residues in the polymer have already been known for a number of years.

It is also well known that the gas mixture leaving the top of a fluidisation reactor may contain solids such as catalyst and polymer in the form of particles. This gas mixture is often treated with a cyclone to separate the gas from the particles. The particles may be recovered from the bottom of the cyclone, for example, using a suction device, such as an ejector-compressor, and then recycled back to the reactor. The gas stream recovered is also recycled to the reactor, usually after cooling and re-compressing.

The compression of this recycle gas creates a significant cost to the process, such cost being related to the total pressure drop of the gas between the reactor and the entrance to the compressor. It is therefore desirable to reduce this pressure drop without adversely affecting the overall process. The pressure drop across the cyclone forms a significant part of the overall pressure drop, and a reduction in this pressure drop would help to reduce the load on the compressor. However, it has been previously thought that it would not be possible to reduce the pressure drop across the cyclone without adversely affecting the efficiency of separation in the cyclone, which could lead to undesirable particle carryover in to the cooling and compressor systems.

However, Applicants have now found that the pressure drop can be reduced whilst still retaining acceptable cyclone efficiency by the use of a novel cyclone design for the separation process or by modifying the design of an existing cyclone.

In accordance with the present invention, there has now been found a cyclone that has an improved balance of pressure drop and efficiency properties when compared to conventional cyclones.

The cyclone of the present invention may be used in any process where such a cyclone is suitable, but is preferably used to separate particles of solid from a gas.

Therefore the present invention also provides a process for the separation of a mixture of gas and solids using a cyclone, wherein said cyclone has an improved balance of pressure drop and efficiency properties when compared to conventional cyclones.

The cyclone of the present invention is particularly useful where high efficiency separation is required and/or the pressure drop across the cyclone is desired to be as low as possible. Preferably the cyclone of the present invention is used for the separation of solid particles from a mixture of gas and solid that has been obtained from a chemical reactor, such as, for example, a fluidised bed reactor. Most preferably the cyclone of the present invention may be used to separate catalyst and polymer particles from a mixture of gas and solids from a gas phase polymerisation fluidised bed reactor.

The low pressure drop may be important where, for example, it may be desirable to recycle the gas and/or solids obtained from the cyclone, for example, back to a fluidised bed reactor. Alternatively, the separated gas and/or solids obtained may be required for further processing and a low pressure drop across the cyclone may be desirable for this purpose. For example, higher pressure may favour further processing of the gas stream obtained from the cyclone. A reduced pressure drop across the cyclone may therefore give improved downstream processing; for example, it may save on downstream compressor costs.

Figure 1:
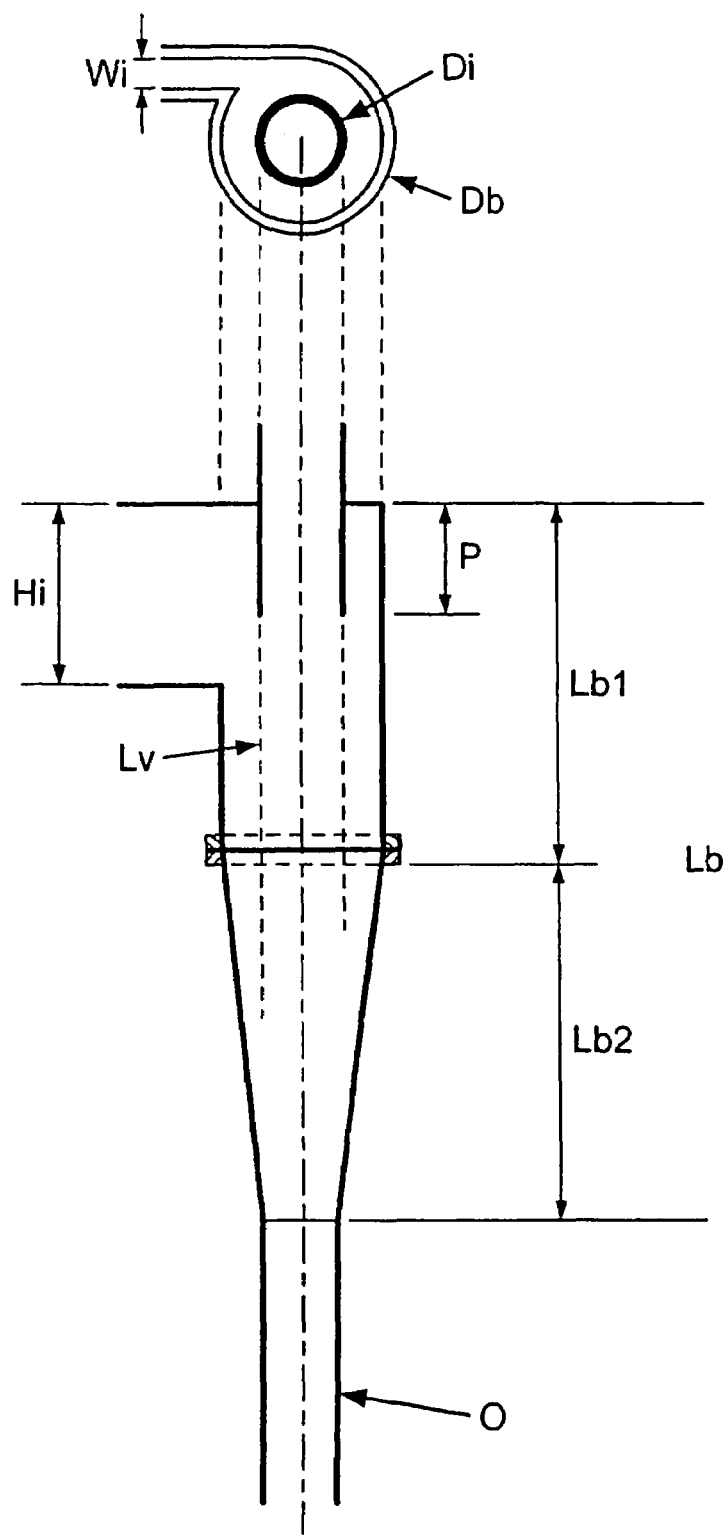
FIG. 1 shows a conventional cyclone.

FIG. 1 shows a conventional cyclone as may be used to separate solid particles from a mixture of gas and solids, for example, from a fluidised bed polymerisation reaction. The cyclone comprises an inlet device, characterised by a cyclone inlet height (Hi), a cyclone inlet width (Wi) and a cyclone inlet aspect ratio (Hi/Wi), a gas outlet pipe, characterised by a gas outlet pipe diameter (Di) and a gas outlet pipe penetration (P), a barrel which is made of a cylindrical and conical parts, characterised by an upper barrel (Lb1) diameter (Db), a barrel length (Lb=Lb1+Lb2), and a barrel length to diameter ratio (Lb/Db), and a solids outlet pipe (O).

The other cyclone characteristics are the inlet solids loading (Li in kg solid per m3 of gas), the inlet gas flow (Q, in $m^3/s$), the inlet gas velocity (Ug,I in m/s) and the outlet gas velocity (Ug,o in m/sec).

Conventionally one method of reducing the pressure drop is by increasing the size of the inlet (Hi) to the cyclone system. The gas outlet ingress (P) is conventionally increased by a corresponding amount so that the base of the outlet pipe is below the lowest point of the inlet device (i.e. P>Hi). However, a proportional increase in both the inlet size and gas outlet ingress, whilst reducing the pressure drop, would normally be expected to reduce the overall efficiency of the cyclone.

As shown in the examples, Applicants have now surprisingly found that it was possible thanks to the claimed cyclone design to decrease the pressure drop whilst keeping excellent cyclone efficiency.

Thus, according to the present invention, there is provided an improved cyclone design comprising an inlet device having an inlet height (Hi) and an inlet width (Wi), a gas outlet pipe having a pipe diameter (Di) and a pipe penetration (P), a barrel having an upper barrel diameter (Db) and a barrel length (Lb), said barrel comprising a cylindrical volume on top of a conical volume, a solids outlet pipe (O), and an inlet gas flow (Q), characterised in that the ratio of the inlet gas flow to the square of the upper barrel diameter (Q/Db$^2$) is higher than 0.5, preferably higher than 0.7, and lower than 1.5, preferably lower than 1.2 and in that the barrel length to diameter ratio (Lb/Db) is higher than 3, preferably higher than 3.5, and lower than 6, preferably lower than 4.5.

It will also be readily apparent that the relative relationship of the gas outlet geometry to the inlet geometry may be adjusted within the scope of the invention, depending on the effect to be achieved. The inlet geometry will affect the pressure drop of the cyclone and the gas outlet penetration will affect the efficiency.

It will be also be readily apparent that other factors known in the art, such as the barrel diameter, cyclone length, gas and solid outlet diameters, and inlet and outlet velocities will also affect the pressure drop and efficiency of the cyclone of the present invention. The variation of any such parameters in the design of a cyclone is considered within the scope of the invention.

The inlet geometry according to present invention may be any geometry as known in the art. The inlet may be of any cross-section, such as, for example, circular, oval or rectangular, but is preferably of rectangular cross-section. The inlet may impinge on to the barrel of the cyclone in any known geometry, for example, in a volate geometry (where the inlet is effectively square on to the barrel), or, preferably, in a tangential geometry. In another embodiment the cyclone entry port is designed such that mixture enters into the cyclone in what is known as a spiral entry.

In certain embodiments of this invention it may also be possible for the cyclone to have more than one inlet pipe.

In other embodiments more than one cyclone may be used within a particular process. Cyclones according to the present invention may be used in series or may be used in parallel with other cyclones according to the present invention. Alternatively, cyclones according to the present invention may be used in series or may be used in parallel with any other cyclones. The suitability of such combinations may be determined by one skilled in the art depending on the separations it is desired to obtain.

The cyclone of the present invention may include any other parts that are known in the art to be used with a cyclone. For example, it may use a vortex stabiliser in the base of the cyclone. However, thanks to the pressure drop gain obtained with the cyclone design of the present invention, there is such an improvement made on the vibration side that the vortex is no more mandatory; it is consequently a preferred embodiment of the present invention to propose the cyclone in the absence of any additional vortex.

According to a preferred embodiment of the present invention, the inlet gas velocity of the invention cyclone is higher than 6 m/s. According to another preferred embodiment of the present invention, the inlet gas velocity of the invention cyclone is lower than 25 m/s, preferably lower than 18 m/s, more preferably lower than 15 m/s.

According to another preferred embodiment of the present invention, the cyclone inlet height (Hi) and the a gas outlet pipe penetration (P) are such that the ratio P/Hi is higher than 0.62 and lower than 1.25.

The present invention also relates to a process for the separation of a mixture of gas and solids using the above cyclone wherein the ratio of the inlet gas flow to the square of the upper barrel diameter (Q/Db$^2$) is higher than 0.5, preferably higher than 0.7, and lower than 1.5, preferably lower than 1.2.

The present invention also relates to the use of the claimed cyclone to separate catalyst and polymer particles from a mixture of gas and solids exiting a gas phase polymerisation fluidised bed reactor wherein the ratio of the inlet gas flow to the square of the upper barrel diameter (Q/Db$^2$) is higher than 0.5, preferably higher than 0.7 and lower than 1.5, preferably lower than 1.2.

By way of illustration of the polymer powders of interest in the present invention, the following are mentioned:

SBR (a polymer based on butadiene copolymerized with styrene);

ABS (an acrylonitrile-butadiene-styrene polymer);

nitrile (a polymer based on butadiene copolymerized with acrylonitrile);

butyl (a polymer based on isobutylene copolymerized with isoprene);

EPR (an ethylene-propylene polymer);

EPDM (a polymer based on ethylene copolymerized with propylene and a diene such as hexadiene, dicyclopentadiene or ethylidene norbornene);

an ethylene-vinyltrimethoxysilane copolymer, a copolymer of ethylene and of one or more compounds chosen from acrylonitrile, maleic acid esters, vinyl acetate, acrylic and methacrylic acid esters and their homologues.

According to a preferred embodiment of the present invention, it applies to polymers that are preferably polyolefins, particularly copolymers of ethylene and/or of propylene and/or of butene. The preferred alpha-olefins which are used in combination with ethylene and/or propylene and/or butene are those having from 2 to 8 carbon atoms. However, it is also possible to use small amounts of alpha-olefins having more than 8 carbon atoms, for example from 9 to 40 carbon atoms (for example, a conjugated diene).

Preferably, the invention applies to the production of polypropylene or, more preferably, to polyethylene, for example linear low-density polyethylene (LLDPE) based, for example, on copolymers of ethylene with 1-butene, 4-methylpentene or hexene, or high-density polyethylene (HDPE) based, for example, on ethylene homopolymers or copolymers of ethylene with small proportions of higher alpha-olefins, for example 1-butene, 1-pentene, hexene or 4-methyl-1-pentene.

Preferably, the present invention relates to the continuous production of polyethylene powder in an industrial plant comprising a gas-phase polymerization reactor of the vertical fluidized-bed reactor type. Preferably, this polymerization is carried out at an absolute pressure of between 0.5 and 6 MPa and at a temperature of between 60° C. and 130° C. For example, in the case of LLDPE production the polymerization temperature is preferably between 75 and 110° C. and in the case of HDPE it is generally between 80 and 120° C. depending on the activity of the catalyst used and on the desired properties of the polymer.

Preferably, the continuous polymerization is carried out in a vertical fluidized-bed reactor in accordance with what is described in the patents (applications) EP-0,855,411, FR No. 2,207,145 or FR No. 2,335,526. The process according to the present invention therefore applies in particular to industrial scale plants, namely, by way of example, to fluidized-bed polymerization reactors whose annual polymer production is at least one hundred thousand tonnes, preferably at least two hundred thousand tonnes.

In the polymerisation process a stream comprising gaseous species, such as, for example, monomer and comonomer olefins and optional inert gas like nitrogen, and entrained fines, such as, for example, catalyst or polymer particles, may be carried over from the top of the fluidised bed reactor. This stream is passed to the cyclone of the present invention, wherein the fines are separated from the gaseous stream. The particles may be recovered from the bottom of the cyclone, for example, using a suction device, such as an ejector-compressor, and then recycled back to the reactor.

The gas stream recovered may also be recycled to the reactor. The recycle gas is preferably cooled and recompressed prior to return to the fluidised bed, preferably as the fluidising gas. Preferably the temperature of the recycle gas can be adjusted in a heat exchanger. The recycle gas generally comprises the monomer and co-monomer olefins, optionally together with, for example, an inert diluent gas such as nitrogen or a gaseous chain transfer agent such as hydrogen. Monomers consumed by the polymerisation reaction may be replaced by adding make up gas or liquid to the recycle gas. In the absence of cooling of the recycle gas the fluidised bed would increase in temperature and, for example, the catalyst may become inactive or the bed may commence to fuse.

In a conventional recycle, as described above but with a conventional cyclone, 30% or more of the total pressure drop may occur across the cyclone separator. By reducing this pressure drop using a cyclone of the present invention it is possible to significantly reduce the loading on the compressor in the recycle loop, giving significant cost savings in the polymerisation process.

Preferably, this polymerization is carried out in the presence of a catalytic system of the Ziegler-Natta type, which generally consists of a solid catalyst essentially comprising a compound of a transition metal and a cocatalyst comprising an organic compound of a metal (for example an organometallic compound, for example an alkylaluminium compound). Catalytic systems having a high activity of this type in general comprise a solid catalyst that essentially consists of transition-metal, magnesium and halogen atoms. Ziegler catalysts supported on silica are also appropriate (e.g. U.S. Pat. No. 5,075,270, EP 0453088, and EP 0595574). In particular, it is also possible to use catalysts of the metallocene type as well as iron and/or cobalt complex catalysts, for example those described in WO98/27124 or WO99/12981, and in U.S. Pat. Nos. 4,530,914, 5,124,418, 4,808,561, 4,897,455, 5,278,264, 5,278,119 and 5,304,614. It is also possible to use catalysts based on chromium oxide supported on a refractory oxide.

The catalysts may be used together with a cocatalyst or activator. For example, metallocene catalysts are often used in the presence of activators, such as alumoxane. It is also known to use ionising activators, activators which are neutral or ionic, or compounds such as tri (n-butyl) ammonium tetra (pentaflurophenyl) boron or trisperfluoro phenyl boron metalloid precursor, which ionise the neutral metallocene compound. Metallocene catalysts may also be used in the presence of suitable activating cocatalysts such as ion forming compounds, for example ammonium-, phosphonium-, oxonium-, carbonium-, silylium-, sulfonium-, or ferrocenium-salts of compatible, noncoordinating anions, and Lewis acids, such as C1-30 hydrocarbyl substituted Group 13 compounds and perfluorinated tri(aryl)boron compounds.

The catalyst system may also include an antistatic agent, for example, those described in U.S. Pat. No. 5,283,278, which is fully incorporated herein by reference. Non-limiting examples of antistatic agents include, alcohol, thiol, silanol, diol, ester, ketone, aldehyde, acid, amine, and ether compounds. Tertiary amines, ethoxylated amines, and polyether compounds are preferred. The antistatic agent may be added at any stage in the formation of the catalyst system.

The catalyst system may also include a polyolefin wax or tackifier or the like. The catalysts may be used as such or in the form of a prepolymer.

The cyclone of the present invention will now be illustrated by a series of examples:

EXAMPLES

A series of cyclones replicating scale-down versions of a commercial gas phase polyethylene plant cyclone were built ($1/15^{th}$ scale based on barrel diameter; $1/225^{th}$ scale based on gas flow). The cyclones were placed into a fluidised bed gas test rig capable of running at identical conditions as an industrial gas phase fluid bed process. Each cyclone in the following examples were tested at the following range of test conditions in order to determine it's collection efficiency ($E_o$) and pressure drop ($\Delta P$) curve versus gas flow rate ($Q$):

| | |
|---|---|
| Pressure | 350 psig (24 bar, g) |
| Temperature | 158° F. (70° C.) |
| Solids loading | 0.004 to 0.8 kg solid per m3 gas |
| Gas inlet velocity | 5-20 m/sec |
| Gas outlet velocity | 5-10 m/sec |

In the following examples, the test results are expressed as a function of the inlet solids loading (Li . . . kg solid per m3 of gas), inlet gas velocity (Ug,i . . . m/s), outlet gas velocity (Ug,o . . . m/sec), outlet tube penetration (P), cyclone inlet height (Hi) cyclone inlet width (Wi), cyclone inlet aspect ratio (Hi/Wi), barrel diameter (Lb), barrel length to diameter ratio (Lb/Db).

Figure 5:
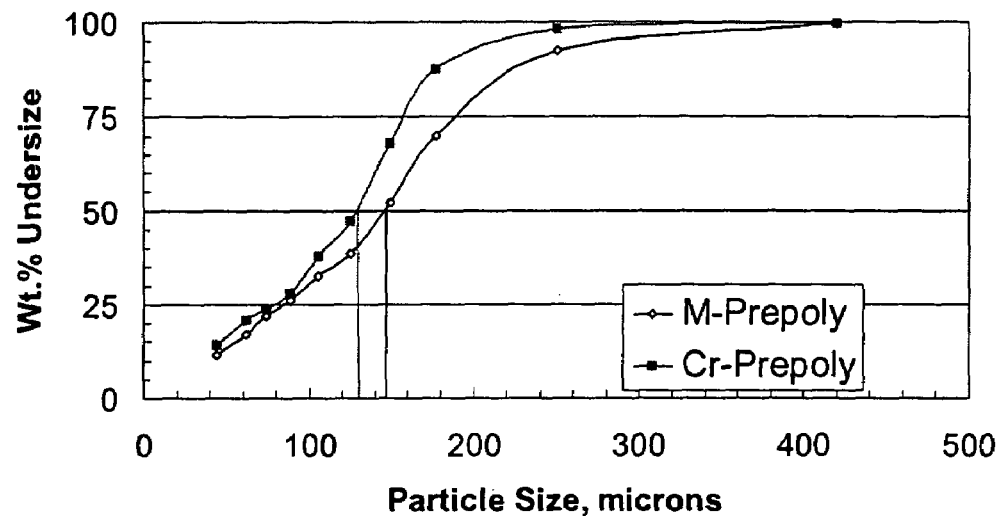
FIG. 5 is a graph showing particle size distribution of Ziegler M and Cr catalyst.

To simulate the fines loading to the cyclones in a manner to be nearly identical to the commercial plant, prepolymer fines made from a Ziegler M catalyst and from a Cr catalyst were used. See FIG. 5. The particle size distributions of the Ziegler M and Cr were:

The mean particle size of the Ziegler M was 145 µm and the mean particle size of the "Cr" fines was 130 µm. The % fines less than 44 µm was 11% for the "M" fines and 14% for the "Cr" fines. Further, the prepolymer powder had the following properties:

Melt Index (IF2)=1.60

Al/Ti=1.40

Activity=25.1 g/gmole/hr

Bulk Density (MVA)=320 kg/m3

These particle size distributions are typical of fines carry over from a commercial gas phase reactor bulb and collected by the cyclone in a commercial gas phase plant.

Example 1

Standard Gas Phase Cyclone—No Vortex Stabilizer

Figure 2:
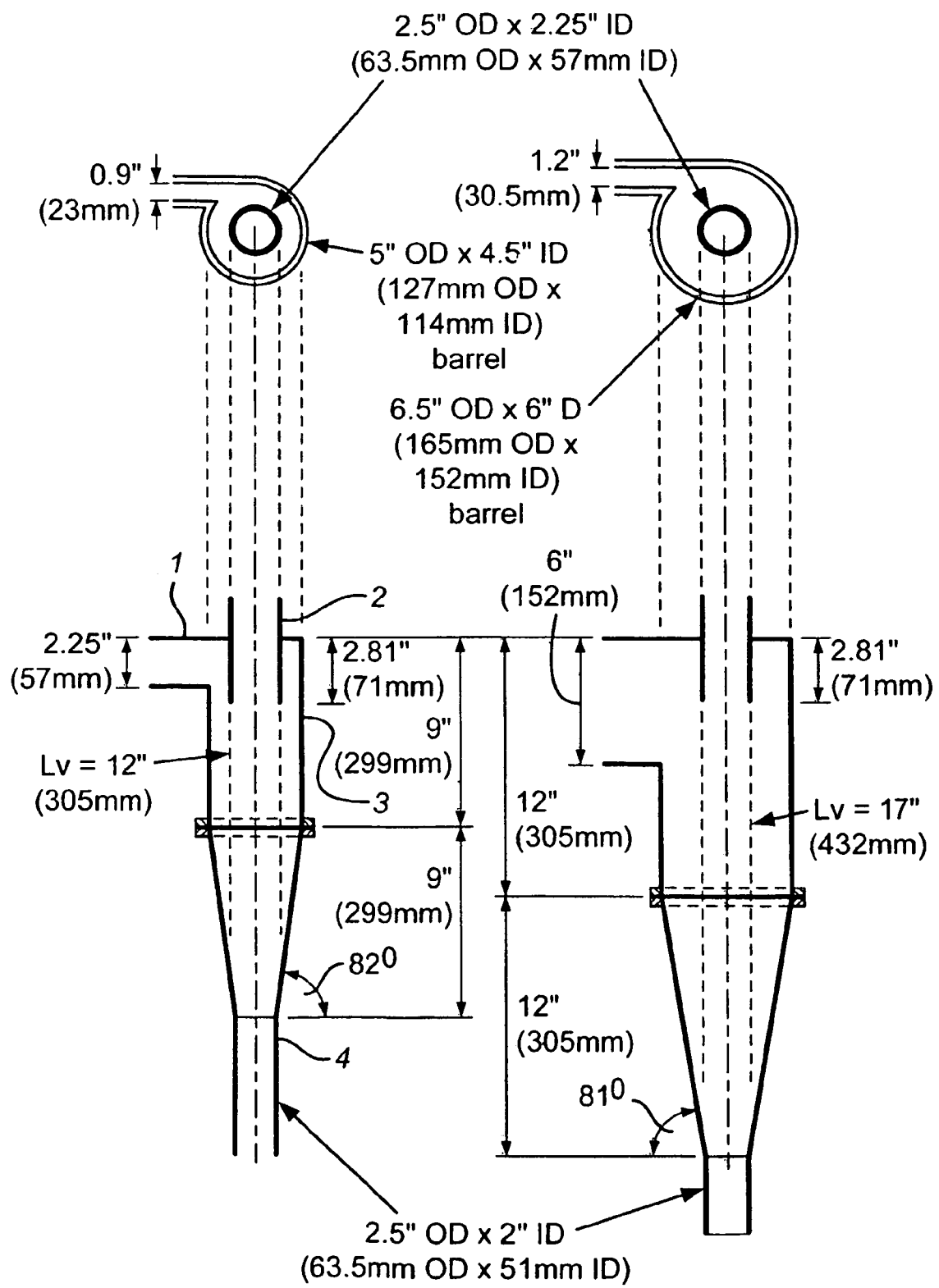
FIG. 2 shows a gas phase cyclone 1A without a vortex stabilizer and a large barrel diameter gas phase cyclone 3.

Normal Aspect Ratio, Full Penetration, Short Barrel (Hi/Wi=2.5, P/Hi=1.25, Lb/Db=4.0) Cyclone 1A —FIG. 2—

A cyclone designated No 1A was built at $1/15^{th}$ scale and having identical geometry design to a commercial cyclone in a gas phase polyethylene plant except that this cyclone had the feature of not being equipped with a vortex stabilizer.

The below series of runs demonstrated that:

1. The reproducibility of the cyclone efficiency measurement is within 0.01%
2. Increased operating temperature has no effect on collection efficiency but decreases the overall pressure drop slightly
3. The pressure drop of a standard gas phase cyclone, for example operated with Ug,i=20 m/s, equals 400 mbar.
4. The cyclone collection efficiency at of a standard gas phase cyclone (Ug,i=20 m/sec) without a vortex stabilizer equals 99.834%+/−0.012%.

| Run N° | P, bar, g | T, ° C. | Li, kg/m3 | ϵ, % | ΔP, mbar |
|---|---|---|---|---|---|
| 1a | 24 | 38 | .056 | 99.825 | 399 |
| 1b | 24 | 38 | .055 | 99.842 | 398 |
| 2 | 24 | 75 | .056 | 99.839 | 351 |

| Run N° | P, bar, g | Li, kg/m3 | ϵ, % | ΔP, mbar |
|---|---|---|---|---|
| 1a, 1b | 24 | 0.055 | 99.8335% | 398.56 |
| 5a, 5b | 24 | 0.111 | 99.9390% | 328.81 |
| 3 | 12 | 0.083 | 99.934% | 174.37 |
| 4 | 1 | 0.058 | 99.930% | 94.66 |

Figure 6:
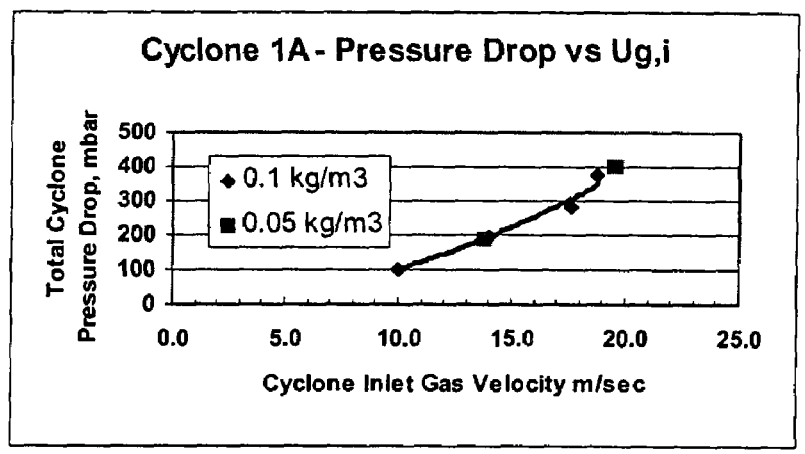
FIG. 6 is a graph showing pressure drop versus inlet gas velocity of cyclone 1A.

For this cyclone it was found that the pressure drop curve was dependent mainly on inlet gas velocity and relatively independent of solids loading as shown in FIG. 6.

Figure 7:
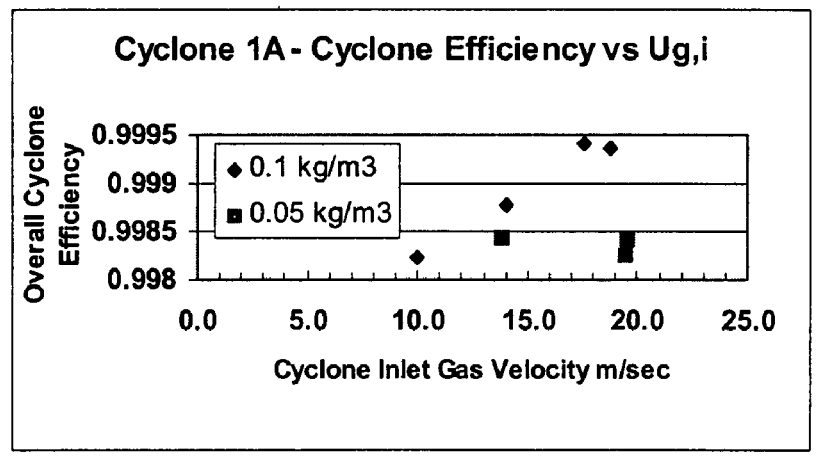
FIG. 7 is a graph showing cyclone efficiency versus inlet gas velocity of cyclone 1A.

Further testing demonstrated that the cyclone collection efficiency increases with solid loadings at solid loadings greater than 0.1 kg/m3 but was independent of solid loadings at solid loadings less than 0.1 kg/m3. See FIG. 7.

Figure 8:
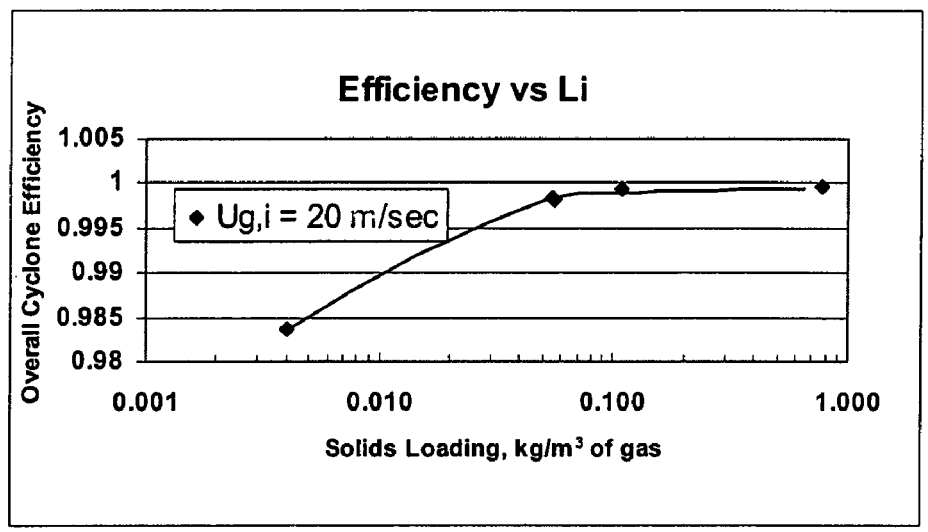
FIG. 8 is a graph showing efficiency versus solid loading of cyclone 1A.

Typically a gas phase plant operates with cyclone inlet loadings between 0.005 and 0.5 kg solid per m3 gas. The cyclone efficiency at constant gas inlet velocity (Ug,i=20 m/sec) increases with solids loading as shown in FIG. 8. Efficiency is asymptotic above 0.1 kg/m3.

A series of runs was made comparing the cyclone performance with Cr fines and Ziegler M fines. The below table of results illustrates that the cyclone collection efficiency for Cr is higher than for Ziegler M fines, especially considering that the Cr material has more fines (14% vs 11% less than 44 μm).

| | Cyclone Configuration | | | |
|---|---|---|---|---|
| | 1A | 1A | 1A | 1A |
| Test N° | 1a, 1b | 10 | 5a | 11 |
| Powder | Ziegler M | Cr | Ziegler M | Cr |
| Loading | Low | Low | High | High |
| Inlet Velocity, Ug, i, m/s | 19.53 | 20.01 | 18.82 | 20.05 |
| Outlet Velocity, Ug, o, m/s | 10.03 | 10.28 | 9.67 | 10.30 |
| Solids Load, Li, kg/m3 gas | 0.055 | 0.046 | 0.108 | 0.103 |
| Pressure Drop, mbar | 398.56 | 401.05 | 373.65 | 411.02 |
| Collection Efficiency, % | 99.8335 | 99.968 | 99.9374 | 99.988 |

However the trends for the pressure drop and the cyclone efficiency versus the gas throughput rate and solids loading are the same for both Cr and M fines. Therefore the rest of the examples are shown only for M operation.

To summarize the results of cyclone 1A in this example, the cyclone collection efficiency of a standard gas phase cyclone (Ug,i=20 m/sec) without a vortex stabilizer varies from 99.936%+/−0.01% (low solids loadings) to 99.96%+/−0.01% (high solids loading) with an average of 99.585%+/−0.007%. These experiments also teach that cyclone efficiency is fairly constant above 0.1 kg solid per m3 gas. Collection efficiency in Cr is higher than M but the trends are the same.

Invention Examples 2 to 4

Large Barrel Diameter Gas Phase Cyclone

In the next series of examples, the geometry of a large barrel diameter gas phase cyclone was modified in order to optimise its cyclone efficiency. As in the previous examples, each cyclone was tested at constant pressure (24 brag), temperature (70° C.) over a range of solids loadings (0.004 to 0.8 kg solid/m3 gas). The table summarizes the geometry of cyclones designated as No 3, 3A and 3B.

It is taught in the litterature that to increase cyclone efficiency at constant volumetric gas flow, it is necessary to decrease cyclone diameter. Contrary to what is taught in the prior art, it was found that the highest efficiency could only be obtained by increasing the barrel diameter of the cyclone.

Geometries of Large Barrel Diameter Cyclones

| Cyclone N° | Change from Previous Design | Inlet Height (Hi, mm) | Inlet Width (Wi, mm) | Aspect Ratio (Hi/Wi) | Barrel Length (Lb, mm) | Barrel Diameter (Db, mm) | Lb/Db (—) | Outlet Tube Penetration (P, mm) | P/Hi (—) | Cone Angle, ° |
|---|---|---|---|---|---|---|---|---|---|---|
| 1A | Standard Cyclone | 57 | 23 | 2.5 | 458 | 114 | 4.0 | 71 | 1.25 | 82 |
| 3 | High Aspect Ratio | 152 | 30.5 | 5.0 | 610 | 152 | 4.0 | 71 | 0.47 | 81 |

-continued

| Cyclone N° | Change from Previous Design | Inlet Height (Hi, mm) | Inlet Width (Wi, mm) | Aspect Ratio (Hi/Wi) | Barrel Length (Lb, mm) | Barrel Diameter (Db, mm) | Lb/Db (—) | Outlet Tube Penetration (P, mm) | P/Hi, (—) | Cone Angle, ° |
|---|---|---|---|---|---|---|---|---|---|---|
| 3A | Full Penetration, Low Aspect Ratio | 78 | 30.5 | 2.5 | 610 | 152 | 4.0 | 80 | 1.0 | 81 |
| 3B | Elongate Barrel, Full Penetration, Low Aspect Ratio | 78 | 30.5 | 2.4 | 762 | 152 | 5.0 | 80 | 1.0 | 81 |

Experimental Results for Large Barrel Diameter Cyclones

| N° | Solids Loading | Runs | Ug, i (m/s) | Ug, o (m/s) | Q, Gas Flow, (Am3/hr) | Q/Db² (Am3/sec/m2) | Li (kg/m3) | Efficiency (%) | Pressure drop (mbar) |
|---|---|---|---|---|---|---|---|---|---|
| 1A | Low | 1a, 1b | 19.53 | 10.03 | 92.4 | 1.97 | 0.0555 | 99.834 | 398.6 |
| " | High | 5a | 18.82 | 9.67 | 88.8 | 1.07 | 0.108 | 99.937 | 373.7 |
| 3 | Low | 22 | 5.49 | 9.98 | 91.8 | 1.10 | 0.049 | 96.162 | 80.7 |
| " | High | 23 | 5.59 | 10.16 | 93.6 | 1.13 | 0.104 | 96.910 | 74.23 |
| 3A | Low | 34 | 10.73 | 9.97 | 93 | 1.12 | 0.047 | 99.935 | 132.0 |
| " | High | 35 | 10.92 | 10.15 | 92.4 | 1.11 | 0.104 | 99.962 | 132.0 |
| 3B | Low | 40 | 10.73 | 9.97 | 91.8 | 1.10 | 0.047 | 99.935 | 134.5 |
| " | High | 41 | 10.92 | 10.15 | 93 | 1.12 | 0.104 | 99.965 | 128.3 |

Invention Example 2

Large Barrel Diameter Cyclone

Large Aspect Ratio, Short Penetration, Short Barrel (Hi/Wi=5.0, P/Hi=0.47, Lb/Db=4.0) Cyclone no 3 —FIG. 2—

In the example, the barrel diameter was increased 33% compared with a standard cyclone. Designated cyclone No3, this cyclone was constructed with aspect ratio (Hi/Wi=5) twice as large as cyclone No1A (Hi/Wi=2.5), in effect increasing the inlet area by 3.5 times, so as to reduce the gas inlet velocity to $1/3.5=28\%$ of its original value, keeping all other aspects of the cyclone geometry to a standard polyethylene gas phase cyclone. See table.

As expected, the pressure drop decreased to 20% of a standard cyclone. However, cyclone No3 has the disadvantage that the cyclone efficiency decreased from 99.834% to 96.162% at low solids loading (0.05 kg solid per m3 gas) and from 99.937% to 96.910% at high solids loading (0.1 kg solid per m3 gas). This is because its inlet gas velocity was too low to achieve the desired separation efficiency.

Invention Example 3

Large Barrel Diameter Cyclone

Figure 3:
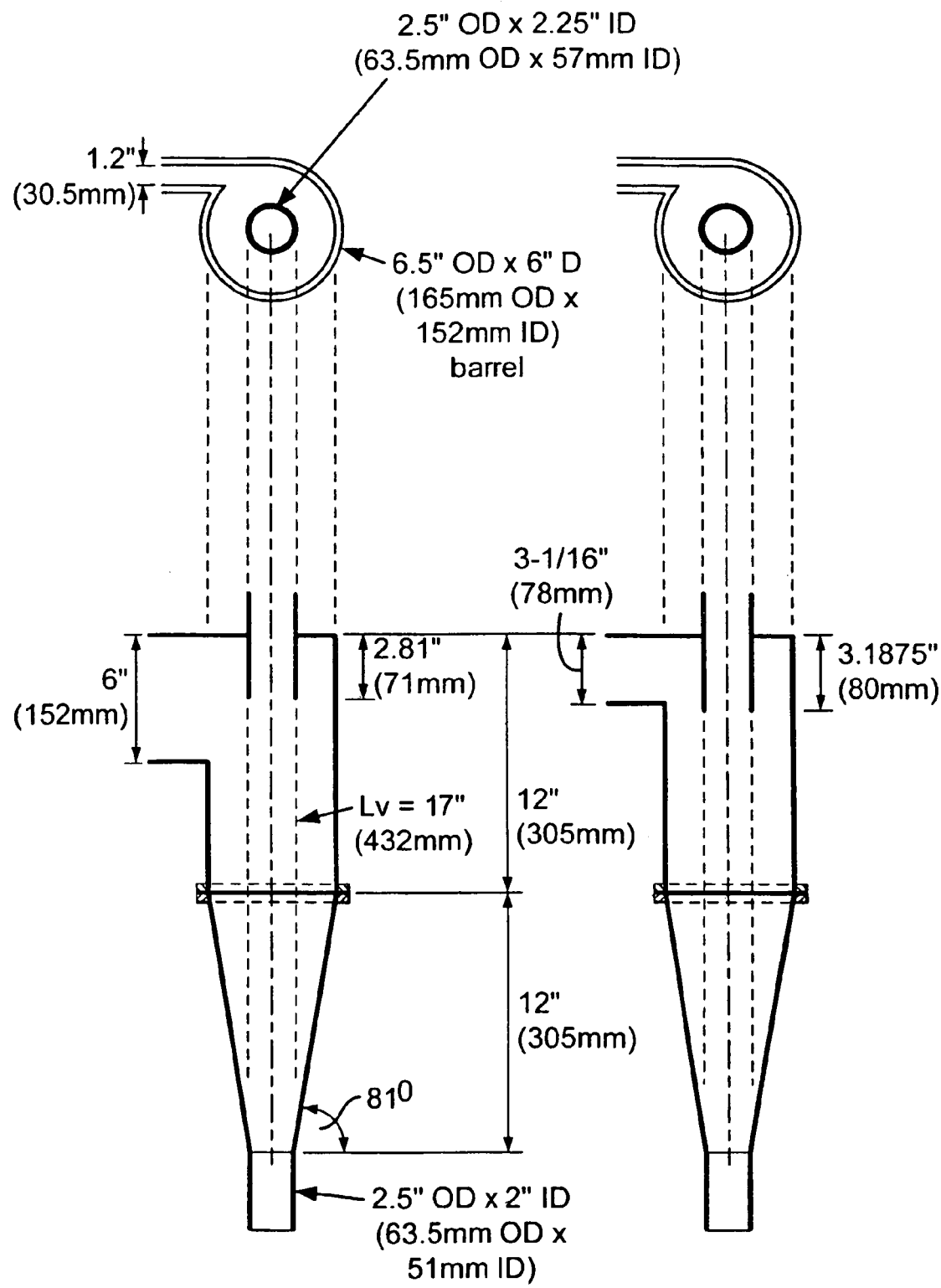
FIG. 3 shows cyclone 3 and a cyclone 3A.

Low Aspect Ratio, Full Penetration, Short Barrel (Hi/Wi=2.5, P/Hi=1.0, Lb/Db=4.0) Cyclone no 3A —FIG. 3—

Cyclone No3A was built in such a fashion as to decrease its inlet aspect ratio, Hi/Wi, from 5 to 2.5, effectively making its inlet area 1.8 times larger than the standard cyclone. As expected, its pressure drop was reduced by the factor $1/1.8^2 = 1/3$ of its original value (from 400 mbar to 132 mbar).

Cyclone efficiency was 99.935% at low solids loading (0.05 kg solid per m3 gas) and 99.962% at high solids loading (0.1 kg solid per m3 gas). This is contrary to prior art since it was though that a large cyclone diameter would have an adverse effect on the collection efficiency.

Pressure drop was 1/3 of the pressure drop of a standard gas phase cyclone when compared at identical volumetric or mass flow rate throughput to the cyclone. See table for the numerical results Invention Example 4

Large Barrel Diameter Cyclone

Figure 4:
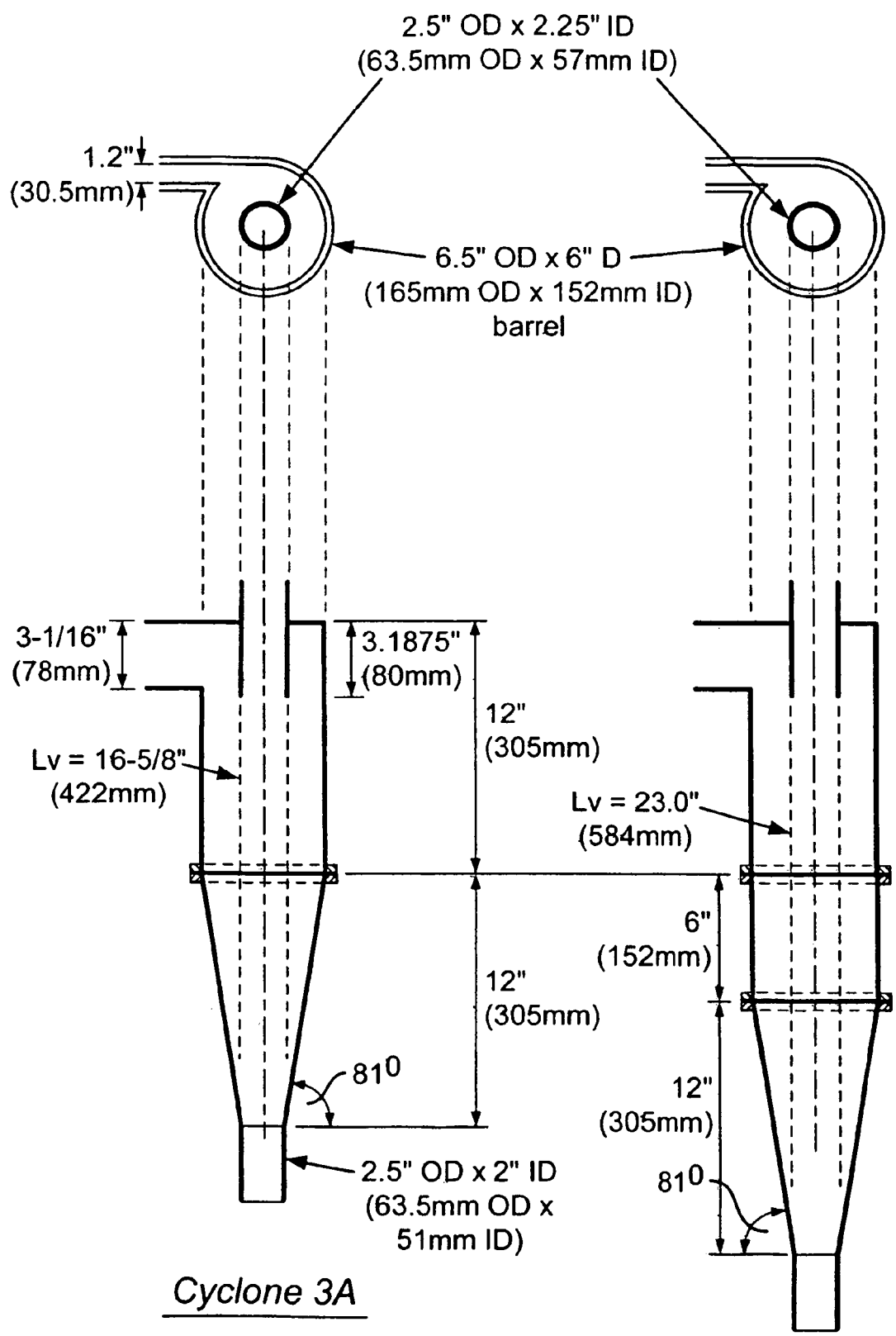
FIG. 4 shows cyclone 3A and a cyclone 3B.

Low Aspect Ratio, Full Penetration, Long Barrel (Hi/Wi=2.5, P/Hi=1.0, Lb/Db=5.0) Cyclone no 3B —FIG. 4—

It is reported in the art that increasing the barrel length can increase a cyclone's efficiency by allowing more cyclones in the cyclone barrel. The large barrel diameter cyclone's barrel was elongated by 25%. Designated cyclone 3B, this cyclone had the same geometry as the cyclone in the previous example but increasing the barrel length to diameter ratio, (Lb/Hb) from 4.0 to 5.0. Cyclone outlet tube penetration was identical (P/Hi=1.0).

Cyclone efficiency was 99.935% at low solids loading (0.05 kg solid per m3 gas) and 99.965% at high solids loading (0.1 kg solid per m3 gas). This is contrary to prior art since it was though that elongating the cyclone barrel would have a beneficial effect on the collection efficiency. Pressure drop was 1/3 of the pressure drop of a standard gas phase cyclone when compared at identical volumetric or mass flow rate throughput to the cyclone. See table for the numerical results In conclusion, the pressure drop across a standard cyclone operating at identical gas flow rate and solid inlet loading can be reduced approximately 33% (in these examples, 33% at low solids loading, 35% at high solids loading) with a slight increase in cyclone collection efficiency. This is accomplished by increasing the barrel diameter by 33% compared with a standard cyclone while keeping identical aspect ratio (Hi/Wi=2.5), simultaneously decreasing the gas inlet velocity from 20 m/sec to 11.5 m/sec. This is novel since the optimum design for minimization of pressure drop and maximisation of cyclone efficiency is contrary to the established art. Classical methods taught in the prior art to increase the cyclone efficiency (changing the outlet tube penetration, and elongating the cyclone barrel length) had no significant effect on the cyclone's efficiency.

Figure 9:
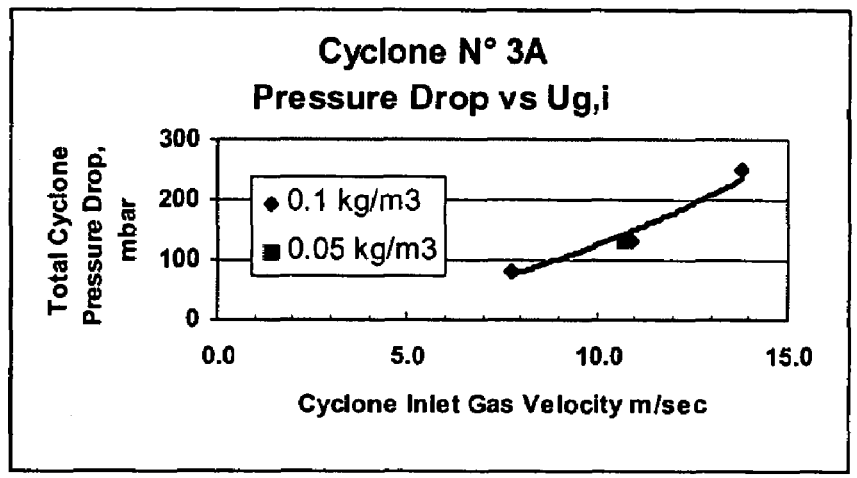
FIG. 9 is a graph showing pressure drop versus inlet gas velocity of cyclone 3A.

As with other cyclone geometries, Cyclone 3A has the characteristic that its pressure drop curve was dependent mainly on inlet gas velocity and relatively independent of solids loading as shown in FIG. 9.

Figure 10:
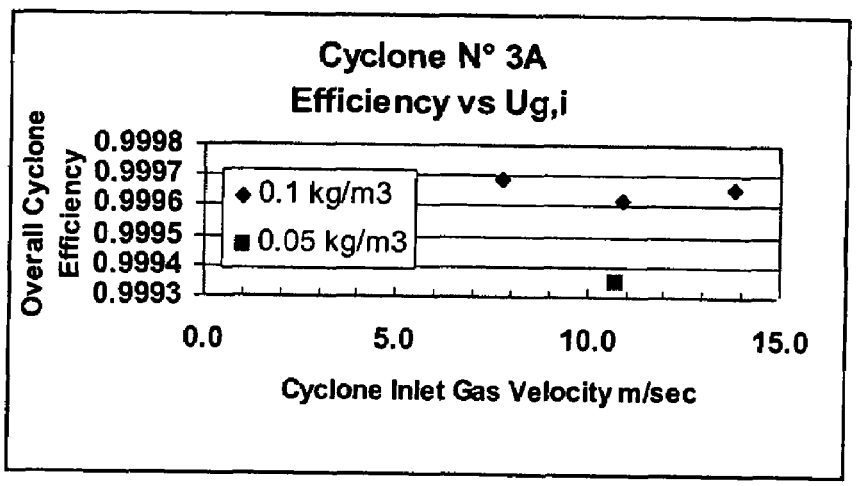
FIG. 10 is a graph showing cyclone efficiency versus inlet gas velocity of cyclone 3A.

This cyclone's collection efficiency is so high that it does not vary much with gas inlet velocity, essentially flat between 8 and 15 m/sec. Efficiency is higher at high solid loadings; however, even at low solids loading it is a very efficient cyclone. See FIG. 10.

Figure 11:
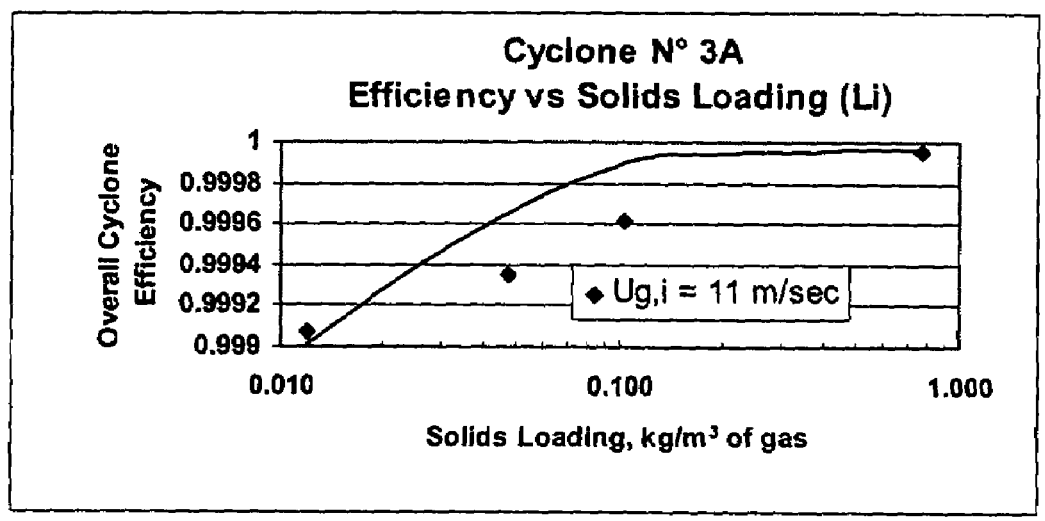
FIG. 11 is a graph showing efficiency versus solid loading of cyclone 3A.

Typically a gas phase plant operates with cyclone inlet loadings between 0.005 and 0.5 kg solid per m3 gas. Cyclone 3A's efficiency at constant gas inlet velocity (Ug, i=11 m/sec) increases with solids loading as shown in FIG. 11, asymptotic above 0.1 kg/m3. However, unlike the efficiency of the other cyclones investigated, notably cyclones 1A and 2B, this cyclone has the advantage of being an extremely efficient cyclone even at low cyclone inlet solids loadings. These findings are contrary to the prior art since a large barrel cyclone was not thought to be so efficient.

The invention claimed is:

1. A cyclone comprising an inlet device having an inlet height (Hi) and an inlet width (Wi), a gas outlet pipe having a pipe diameter (Di) and a pipe penetration (P), a barrel having an upper barrel diameter (Db) and a barrel length (Lb), said barrel comprising a cylindrical volume on top of a conical volume, a solids outlet pipe (O), an inlet gas velocity (Ug,i) and an inlet gas flow (Q), wherein the ratio of the inlet gas flow to the square of the upper barrel diameter (Q/Db$^2$) is higher than 0.5 and lower than 1.5 and the barrel length to diameter ratio (Lb/Db) is higher than 3 and lower than 6.

2. The cyclone according to claim 1, wherein the inlet gas velocity is higher than 6 m/s.

3. The cyclone according to claim 1, wherein the cyclone inlet height (Hi) and the gas outlet pipe penetration (P) are such that the ratio P/Hi is higher than 0.62 and lower than 1.25.

4. The cyclone according to claim 1, wherein the cyclone does not comprise any vortex stabiliser.

5. A process comprising separating a mixture of gas and solids using the cyclone of any one of claims 1-4.

6. A process comprising separating catalyst and polymer particles from a mixture of gas and solids exiting a gas phase polymerisation fluidised bed reactor using the cyclone of any one of claims 1-4.

7. The process of claim 6, wherein the gas phase polymerisation fluidised bed reactor is operated at an absolute pressure of between 0.5 and 6 MPa.

8. The cyclone according to claim 1, wherein the ratio of the inlet gas flow to the square of the upper barrel diameter (Q/Db$^2$) is higher than 0.7.

9. The cyclone according to claim 1, wherein the ratio of the inlet gas flow to the square of the upper barrel diameter (Q/Db$^2$) is lower than 1.2.

10. The cyclone according to claim 1, wherein the barrel length to diameter ratio (Lb/Db) is higher than 3.5.

11. The cyclone according to claim 1, wherein the barrel length to diameter ratio (Lb/Db) is lower than 4.5.

12. The process according to claim 5, wherein the ratio of the inlet gas flow to the square of the upper barrel diameter (Q/Db$^2$) is higher than 0.7.

13. The process according to claim 5, wherein the ratio of the inlet gas flow to the square of the upper barrel diameter (Q/Db$^2$) is lower than 1.2.

14. The process according to claim 6, wherein the ratio of the inlet gas flow to the square of the upper barrel diameter (Q/Db$^2$) is higher than 0.7.

15. The process according to claim 6, wherein the ratio of the inlet gas flow to the square of the upper barrel diameter (Q/Db$^2$) is lower than 1.2.

* * * * *